(12) United States Patent
Saves-Saint-Germes et al.

(10) Patent No.: US 7,426,871 B2
(45) Date of Patent: Sep. 23, 2008

(54) APPARATUS FOR TESTING A FUSELAGE STRUCTURE HAVING A LONGITUDINAL AND CIRCUMFERENTIAL CURVATURE

(75) Inventors: Cyrille Saves-Saint-Germes, Seysses (FR); Patrick Decraecker, Arsac (FR); Olivier Mignon, Villenave d'Ornon (FR); Benoit Lanvers, Eysines (FR)

(73) Assignee: Airbus France, Toulouse (FR)

( * ) Notice: Subject to any disclaimer, the term of this patent is extended or adjusted under 35 U.S.C. 154(b) by 127 days.

(21) Appl. No.: 11/492,819

(22) Filed: Jul. 26, 2006

(65) Prior Publication Data
US 2007/0022821 A1 Feb. 1, 2007

Related U.S. Application Data

(60) Provisional application No. 60/714,829, filed on Sep. 8, 2005.

(30) Foreign Application Priority Data
Jul. 26, 2005 (FR) .................................. 05 07957

(51) Int. Cl.
*G01M 5/00* (2006.01)
(52) U.S. Cl. .............................. 73/802; 73/818; 73/841
(58) Field of Classification Search .................. 73/802, 73/818, 841
See application file for complete search history.

(56) References Cited

U.S. PATENT DOCUMENTS

| | | | | |
|---|---|---|---|---|
| 2,151,584 A | * | 3/1939 | Bugatti .......................... | 73/796 |
| 2,383,491 A | * | 8/1945 | Kemmer et al. ............... | 73/798 |
| 2,425,273 A | * | 8/1947 | Watter .......................... | 73/802 |
| 5,065,630 A | * | 11/1991 | Hadcock et al. ............... | 73/802 |
| 5,113,079 A | * | 5/1992 | Matulka ....................... | 250/550 |
| 5,379,645 A | * | 1/1995 | Smart .......................... | 73/794 |
| 5,425,276 A | * | 6/1995 | Gram et al. ................... | 73/816 |
| 5,712,431 A | * | 1/1998 | Vilendrer ...................... | 73/841 |
| 6,298,729 B1 | * | 10/2001 | Locker et al. ................. | 73/668 |

(Continued)

FOREIGN PATENT DOCUMENTS

CH 254842 1/1949

(Continued)

OTHER PUBLICATIONS

Hans-Jürgen Schmidt, et al., "Tango Metallic Fuselage Barrel Validation of Advanced Technologies", ICAF 2001, Design for Durability in the Digital Age, vol. 1, 1 front page, pp. 272-289.

(Continued)

*Primary Examiner*—Edward Lefkowitz
*Assistant Examiner*—Freddie Kirkland, III
(74) *Attorney, Agent, or Firm*—Oblon, Spivak, McClelland, Maier & Neustadt, P.C.

(57) ABSTRACT

The apparatus for testing of a fuselage structure having longitudinal and circumferential curvature includes an assembly for applying forces to the fuselage structure. It includes a central shaft that extends in the longitudinal direction at the center of the fuselage structure and that is capable of being interlocked with the fuselage structure. The assembly for applying the forces is mounted between the fuselage structure and a support interlocked with the central shaft. The apparatus can be used to perform tests on an airplane fuselage.

21 Claims, 4 Drawing Sheets

U.S. PATENT DOCUMENTS

| | | | |
|---|---|---|---|
| 6,598,486 B2 * | 7/2003 | Vilendrer et al. | 73/841 |
| 7,155,982 B2 * | 1/2007 | Oesmann et al. | 73/841 |
| 2002/0170361 A1 * | 11/2002 | Vilendrer et al. | 73/849 |
| 2005/0109118 A1 * | 5/2005 | Oesmann et al. | 73/841 |
| 2007/0068275 A1 * | 3/2007 | Saves-Saint-Germes | 73/802 |

FOREIGN PATENT DOCUMENTS

| | | |
|---|---|---|
| DE | 717 836 | 2/1942 |
| DE | 297 11 362 U1 | 2/1998 |

OTHER PUBLICATIONS

Marc Langon, et al., "Development of a Test Fixture for Fuselage Curved Panels", ICAF 1999, Structural Integrity for the Next Millennium, pp. 745-753.

Dr. John G. Bakuckas, Jr., et al., "Full-Scale Testing of Fuselage Panels", Proceedings of Autotestcon 2001, Aug. 20-23, 2001, pp. 1-20.

* cited by examiner

APPARATUS FOR TESTING A FUSELAGE STRUCTURE HAVING A LONGITUDINAL AND CIRCUMFERENTIAL CURVATURE

BACKGROUND OF THE INVENTION

1. Field of the Invention

The present invention relates to a testing apparatus associated with a fuselage structure having double curvature.

2. Discussion of the Background

More particularly, the present invention is aimed at providing a testing apparatus that permits testing the static strength, fatigue strength and tolerance to damage of fuselage structures having double curvature, or in other words longitudinal and circumferential curvature.

In practice, these fuselage structures are fuselage rings typically used to construct the aft or fore fuselage of an airplane.

It is known that such a testing apparatus can be used to apply to the fuselage structure, by means of a force-application system, stresses representative of the stresses undergone by the fuselage structure during its use. These stresses are typically tensile or compressive forces exerted in the longitudinal direction of the structure, torsional forces around the circumference of the structure and pressure forces related to the pressure difference existing between the interior and exterior of the aircraft.

For example, there is known a testing apparatus making it possible to apply pressure forces and an axial mechanical load to a structure having simple curvature, of the same type as a cylindrical ring, as described in the document "Development of a test fixture for fuselage curved panels", by M. Langon and C. Meyer, CEAT, ICAF 1999, pages 745 to 753.

Nevertheless, such a testing apparatus cannot be applied to a fuselage structure having double curvature and still be representative of the real stresses experienced by the airplane's fuselage structure.

SUMMARY OF THE INVENTION

The objective of the present invention is to resolve the aforesaid disadvantages and to provide an apparatus for testing a fuselage structure having double curvature.

To this end, the testing apparatus associated with a fuselage structure having longitudinal and circumferential curvature comprises an assembly of means for applying forces to the fuselage structure.

According to the invention, it comprises a central shaft that extends in the longitudinal direction at the center of the fuselage structure and that is capable of being interlocked with the fuselage structure, the assembly of force-application means being mounted between the fuselage structure and support means interlocked with the central shaft.

Thus the testing apparatus according to the invention has a central shaft that makes it possible to form a rigid structure at the center of the fuselage structure and to absorb the stresses applied to the fuselage structure.

By virtue of the absorption of stresses at the center of the fuselage structure, the space outside the structure is unobstructed, permitting continuous inspection of the fuselage structure subjected to constraints.

According to one embodiment of the invention, the testing apparatus comprises interlocking means capable of interlocking the central shaft with an upper end of the fuselage structure, the force-application means being capable of applying forces at a lower end of the fuselage structure.

This arrangement makes it possible to subject the fuselage structure as a whole to torsional or tensile/compressive constraints. The central shaft makes it possible to absorb the stresses applied to the fuselage structure between its lower and upper ends.

According to one embodiment of the invention, the support means include a base plate capable of supporting means for applying forces of a first type and a footing fixed to the central shaft and capable of supporting means for applying forces of a second type.

Thus it is possible to decouple the application of two types of force in such a way that the applied forces can be modified independently of one another during the tests, and the analysis of the results on the structure can be made in decorrelated manner for the different types of forces applied.

In practice, the means for applying forces of a first type are capable of applying a torsional force to the fuselage structure, and the means for applying forces of a second type are capable of applying tensile or compressive forces to the fuselage structure.

Preferably, the means for applying forces of the first type are capable of applying a tangential force to the curved surface of the fuselage structure.

The forces applied in this way can remain collinear with the surface and can accompany the deformation of that surface.

In practice, the means for applying forces of a first type includes at least one jack capable of applying a stress along a horizontal axis and mounted pivotally at its ends around a vertical axis.

By virtue of this pivotal mounting of the ends of the jack, the torsional stress applied to the surface of the fuselage structure can continuously retain a direction tangential to that surface, even after deflection and deformation thereof. In practice, in order to apply the forces regularly to the fuselage structure, the force-application means are interlocked with a load-transfer ring at the point of application of the said force, the lower end of the fuselage structure being fixed to this load-transfer ring.

BRIEF DESCRIPTION OF THE DRAWINGS

Other features and advantages of the invention will become more apparent in the description hereinafter.

In the attached drawings, provided by way of non-limitative examples.

DETAILED DESCRIPTION OF THE PREFERRED EMBODIMENTS

Referring now to the figures, there will be described a practical example of an apparatus for testing a fuselage structure.

Figures 1, 2:
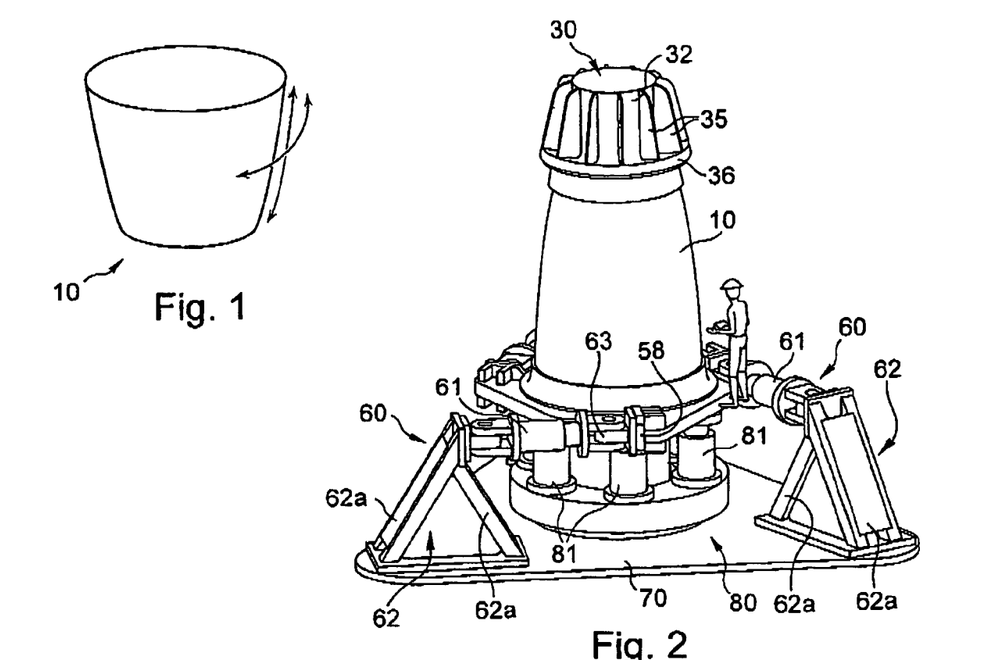
FIG. 1 is a perspective view of a fuselage structure having double curvature.
FIG. 2 schematically illustrates, in perspective, a testing apparatus according to one embodiment of the invention.

The testing apparatus to be described hereinafter makes it possible to test a structure 10 having double curvature as illustrated in FIG. 1.

For example, it may be a fuselage ring having both longitudinal curvature and circumferential curvature, as illustrated by the arrows in FIG. 1.

The testing apparatus makes it possible to test the static strength, fatigue strength and damage tolerance of such a structure.

In general, it makes it possible to apply stresses representative of those experienced by an airplane structure, and especially tensile or compressive forces in the longitudinal direction, torsional forces relative to the longitudinal axis or even pressure forces due to the pressure difference between the interior of the structure and the outside.

It will be understood that it is necessary to be able to combine all of these types of forces to be exerted on the structure.

Figure 3:
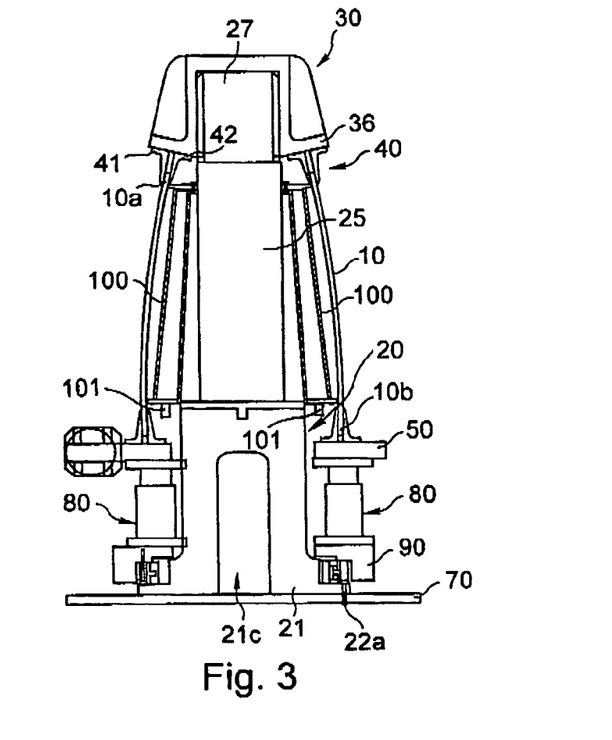
FIG. 3 is a view in longitudinal section of the apparatus of FIG. 2.

A testing apparatus according to one embodiment of the invention is illustrated in general manner in FIGS. 2 and 3.

At present, the behavior of a fuselage structure having double curvature is learned by means of tests and numerical simulations on structures having single curvature.

Test data are therefore necessary to validate and calibrate the numerical models used for the configurations having double curvature, in order to learn the behavior thereof.

The testing apparatus such as described hereinafter also makes it possible to evaluate and study the behavior of new materials (metallic and composites) as well as to study new technologies.

In principle, the testing apparatus comprises a central shaft 20 that extends in the longitudinal direction and at the center of fuselage structure 10.

Central shaft 20 is provided with a pedestal 21 intended to be fixed to the floor and with a vertical stanchion 25.

Figures 4, 5A, 6A:
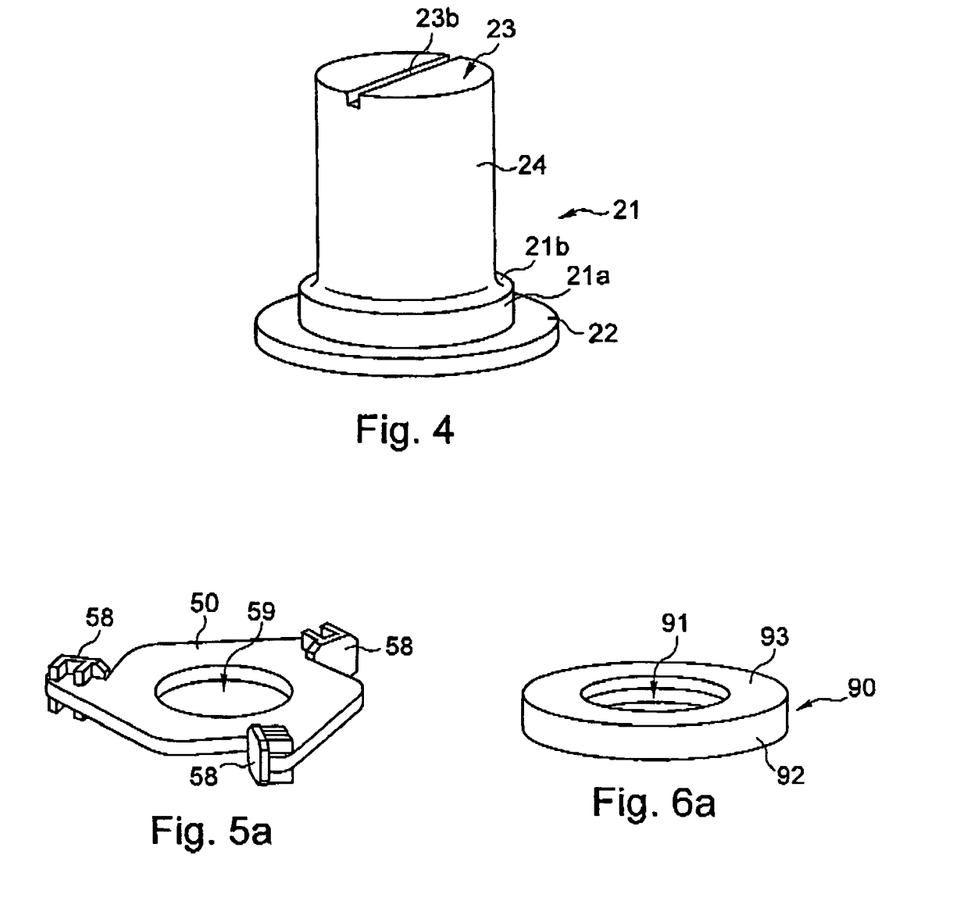
FIG. 4 is a perspective view of the central shaft support of the apparatus of FIG. 2.
FIGS. 5a and 5b are respectively a perspective view and an overhead view of a load-transfer ring of the testing apparatus of FIG. 2.
FIGS. 6a and 6b are respectively a perspective view and a view in section of a footing of the testing apparatus of FIG. 2.

Pedestal 21 is illustrated in particular in FIG. 4. It includes a portion forming foot 22 intended to be fixed by a series of bolts 22a as illustrated in FIG. 3 to a base plate 70, which will be described later.

Pedestal 21 has overall cylindrical outer shape and is provided with a collar 21a forming a shoulder 21b with the cylindrical barrel 24 of pedestal 21. The mounting of force-application means on shoulder 21b will be described later.

Pedestal 21 can be made lighter by means of a central cylindrical hollow 21c.

Figure 7:
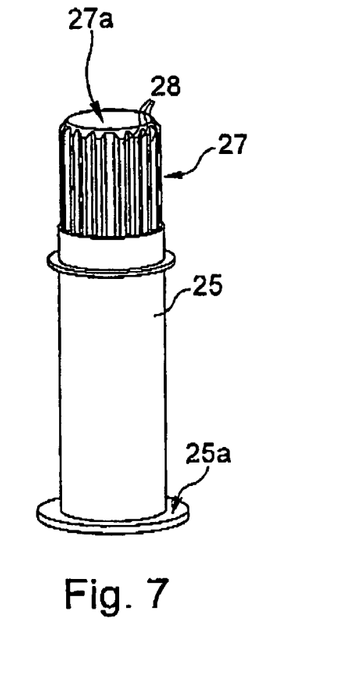
FIG. 7 is a perspective view of the core of the central shaft of the apparatus of FIG. 2.

On one disk-shaped end face 23 opposite foot 22 of pedestal 21 there are provided means of interlocking pedestal 21 with a vertical stanchion 25. In this embodiment, the pedestal is provided with a groove 23b extending along a diameter of disk-shaped end face 23. This groove 23b is capable of cooperating with a complementary rib (not shown) provided on an end face 25a of vertical stanchion 25, as illustrated in FIG. 7.

It will be understood that inverted interlocking means or even other types of interlocking means could be provided between pedestal 21 and stanchion 25, imparting to the structure of central shaft 20 sufficient rigidity to support the stresses applied to fuselage structure 10.

As an example, the vertical stanchion has a diameter of 1 m and a height of approximately 4 m. It will be understood that the height of the vertical stanchion can be modified as a function of the length of fuselage structure 10 to be tested.

Pedestal 21 and vertical stanchion 25 are, for example, cast and machined steel structures, capable of supporting and absorbing the stresses applied to the fuselage structure.

Vertical stanchion 25 is provided at one end 27 with interlocking means 30, 40 capable of interlocking central shaft 20 at one upper end 10a of fuselage structure 10.

Figure 8:
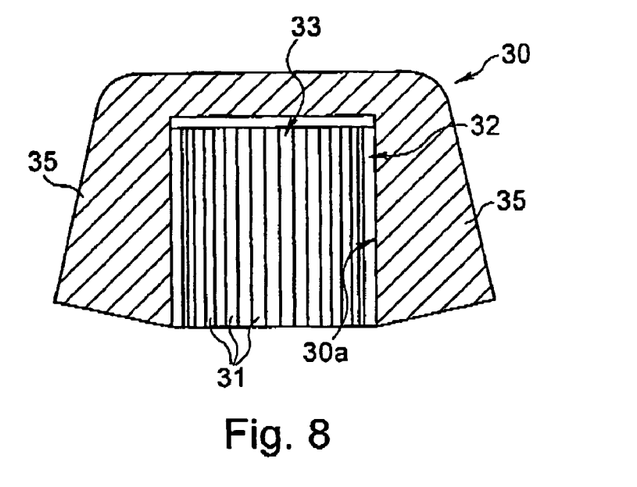
FIG. 8 is a perspective view of an interlocking cover of the apparatus of FIG. 2.

As clearly illustrated in FIG. 8, the interlocking means is provided with a cover 30 interlocked with upper end 27 of central shaft 20.

The fixations of this cover 30 to central shaft 20 must be sufficiently robust to resist the torsional and tensile or compressive forces exerted on structure 10, and therefore to permit central shaft 20 to absorb the stresses to which the structure is subjected.

For this purpose, upper end 27 of vertical stanchion 25 of central shaft 20 in this embodiment comprises a series of flutes 28 extending parallel to the axis of central shaft 20 and fitting into a series of complementary flutes 31 made on an inner face 30a of cover 30.

In practice, this cover 30 has a cylindrical barrel 32 with an internal bore 33 of overall cylindrical shape, the internal cylindrical surface 30a of the said bore being provided with complementary flutes 31.

These flutes are particularly suitable for absorbing the torsional stresses of cover 30 at end 27 of vertical stanchion 25.

In order to interlock central shaft 20 to cover 30 in tension/compression, a series of fixation bolts is provided between the bottom of cover 30 and terminal end 27a of end 27 of vertical stanchion 25.

Cover 30 is also provided on the outside with a series of fins 35 disposed between cylindrical barrel 32 of cover 30 and a flange 36. These fins 35 help to reinforce the structure of cover 30.

Taking into account the forces present and the numerous fixation means intended to interlock cover 30 with vertical stanchion 25, it is important that the central shaft be made of solid material.

On the lower face of flange 36 of cover 30, there are provided fixation means 40 to ensure fixation of upper end 10a of fuselage structure 10.

As clearly illustrated in FIGS. 9a, 9b, 10a, 10b, these fixation means 40 are composed of an outer ring 41 and an inner ring 42, capable of maintaining upper end 10a of fuselage structure 10 by clamping action (see especially FIG. 3).

Figure 9A:
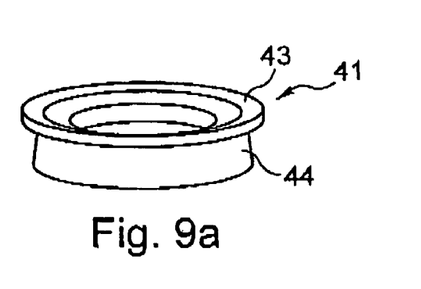
FIGS. 9a and 9b are respectively a perspective view and a view in section of an outer fixing ring of the apparatus of FIG. 2.
Figure 9B:
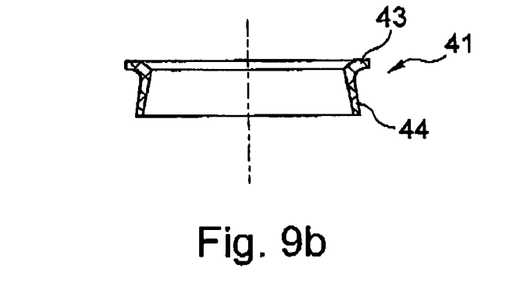

More precisely, these fixing rings 41, 42 have overall cylindrical shape. Outer fixing ring 41 therefore has a flange 43 intended to come into contact with flange 36 of the cover, to which it will be fixed by a series of fixation bolts. This flange 43 is prolonged by a frustoconical portion 44 intended to conform to the outer surface of upper end 10a of fuselage structure 10.

Figure 10A:
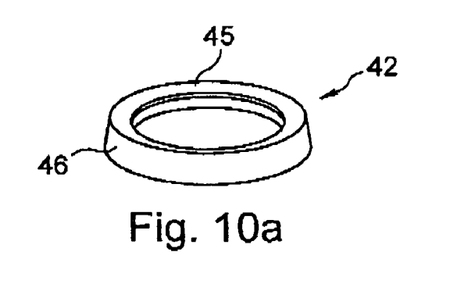
FIGS. 10a and 10b are respectively a perspective view and a view in section of an inner fixing ring capable of cooperating with the outer fixing ring of FIGS. 9a and 9b.
Figure 10B:
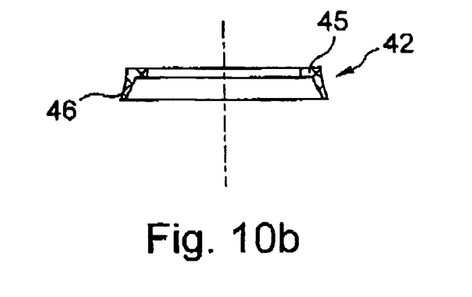

Similarly, inner fixing ring 42 is provided with a flange 45 intended to be fixed, by means of fixation bolts, for example, to flange 36 of cover 30. This flange 45 is prolonged by a frustoconical portion 46 intended to conform to the inner face of top end 10a of fuselage structure 10.

Thus, when fixing rings 41, 42 are fixed to cover 30, with inner fixing ring 42 extending in the interior of frustoconical portion 44 of outer fixing ring 41, frustoconical portions 44, 46 of the rings are capable of pinching upper end 10a of the fuselage structure.

At lower end 10b of the fuselage structure, an identical mounting arrangement is achieved by virtue of fixing means interlocked with a load transfer ring 50.

Just as for upper fixation means 40, lower end 10b of fuselage structure 10 is capable of being maintained by clamping action between two complementary rings 41, 42 defining, between two cylindrical shells, a space for holding end 10b of fuselage structure 10.

Figure 11:
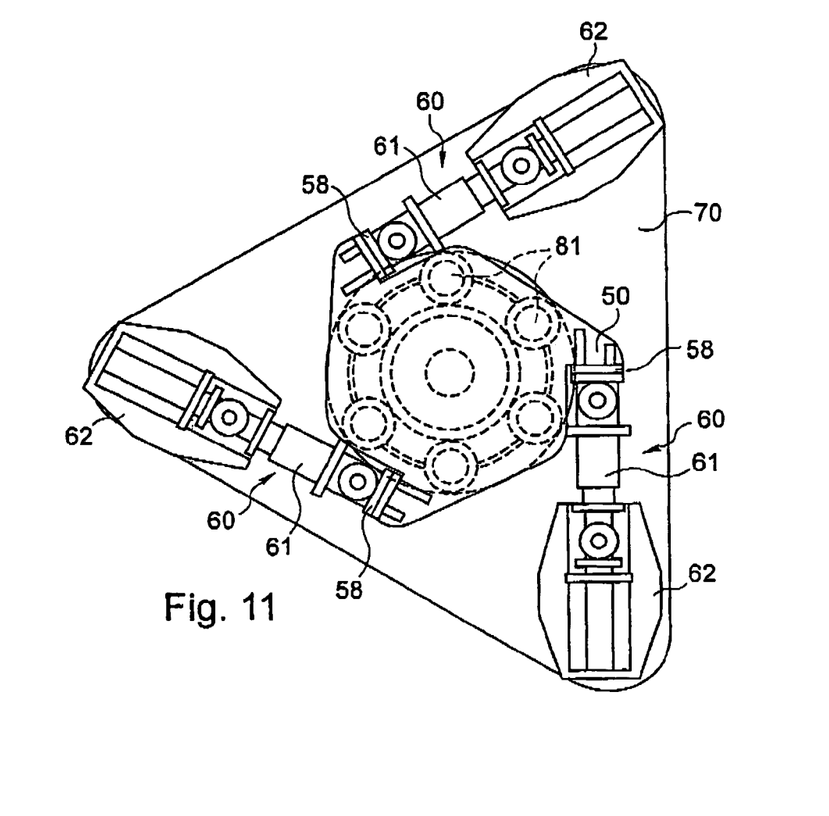
FIG. 11 is an overhead view, without the core of the central shaft and the fuselage structure, illustrating the mounting of the force-application means.
Figure 12:
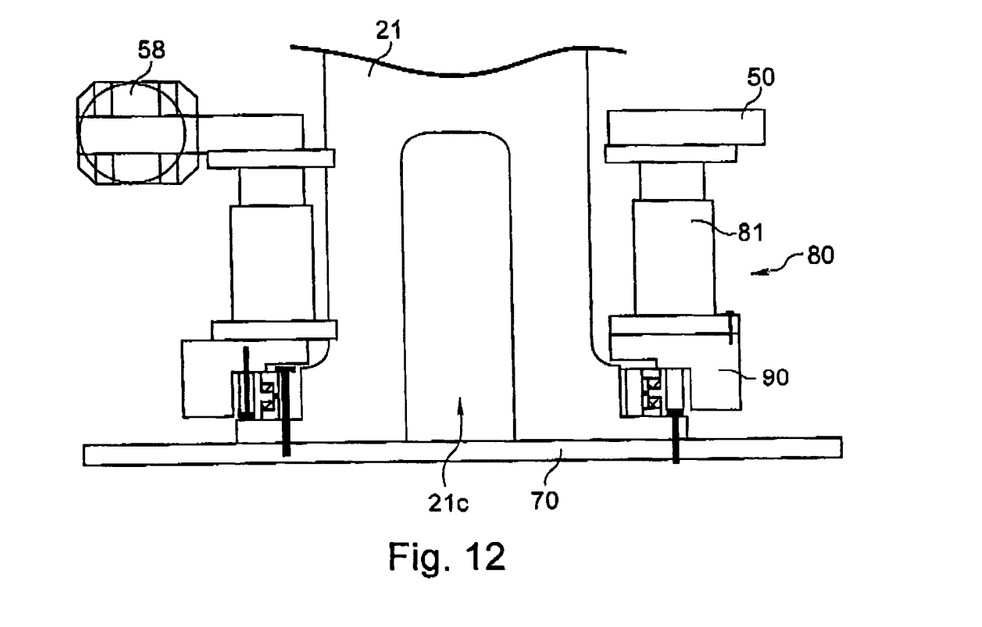
FIG. 12 is a view in partial longitudinal section of the testing apparatus of FIG. 2, illustrating the mounting of the force-application means.

Referring now to FIGS. 11 and 12, there will be described the assembly of force-application means 60, 80. These force-application means 60, 80 are mounted on support means interlocked with central shaft 20.

As indicated herein above, these support means are provided with a base plate 70, clearly illustrated in FIG. 2, of triangular shape in this embodiment.

This base plate 70 is capable of supporting means 60 for application of forces of a first type, and in this case force-application means capable of applying a torsional force to fuselage structure 10.

Furthermore, the support means are provided with a footing 90 fixed to central shaft 20, and in the present embodiment, to pedestal 21. Footing 90 is capable of supporting means 80 for application of forces of a second type, and in this case force-application means 80 capable of applying a tensile or compressive force to fuselage structure 10.

In practice, three jacks 61 capable of applying a torsional force are provided in this embodiment. These jacks are mounted on support devices 62 disposed 120° from one another, and so they are fixed at the corners of triangular base plate 70. These jacks are, for example, hydraulic jacks capable of exerting force along their piston rod.

In order to ensure robust fixation of jacks 61 to base plate 70, support devices 62 are provided with two legs 62a, inclined at an angle of between 45° and 80° relative to base plate 70. Legs 62a form an angle of between 60° and 90° with one another.

Figure 5B:
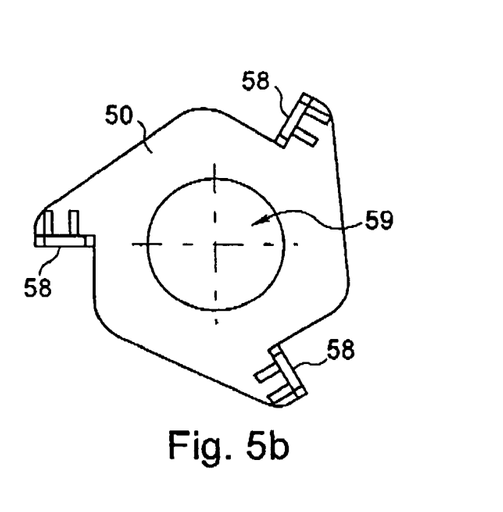

In complementary manner, load-transfer ring 50 on which fuselage structure 10 is fixed is provided with three fixation shoes 58, also disposed at 120°, as is clearly illustrated in FIGS. 5a and 5b.

Load-transfer ring 50 has plane and overall triangular shape, shoes 58 being disposed at the corners of the triangular shape. It is also provided at its center with a circular hole 59, through which central shaft 20 can be passed, and in particular cylindrical barrel 24 of pedestal 21 can be passed.

Each hydraulic jack 61 is disposed horizontally between a support device 62 and a fixation shoe 58. The end of the rod of each jack 61 is interlocked with a fixation shoe 58, for example by means of bolts and an eye joint link.

A similar mounting arrangement at the other end of each jack 61 makes it possible to interlock the said jack with a support device 62. By virtue of this mounting arrangement by means of eye joint links, the ends of the jack are mounted pivotally around two vertical axes, respectively at the point of their mount on support device 62 and at fixation shoe 58.

Thus rotational displacement of load-transfer ring 50 under the stress applied by each hydraulic jack 61 is accompanied by a reaction in which jack 61 pivots in such a way that it maintains a direction of action tangential to the surface of the fuselage structure.

In the present case, the force exerted by each hydraulic jack acts in a horizontal plane, coincident with the plane in which load-transfer ring 50 extends. The force applied in this way is tangential to the surface of the fuselage structure, and it corresponds to a torsional force applied at three equidistant points on the load-transfer ring. Thus it is applied uniformly to load-transfer ring 50.

In parallel with these means for exerting a torsional force on the fuselage structure, there are also provided six hydraulic jacks 81 disposed vertically between load-transfer ring 50 and footing 90.

Figure 6B:
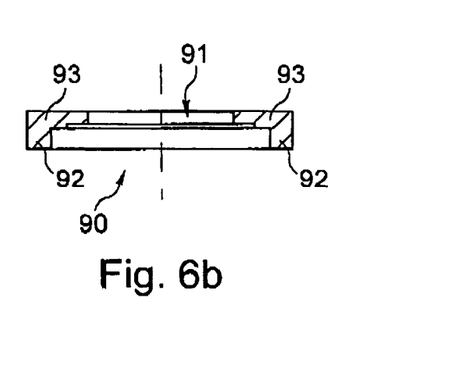

As clearly illustrated in FIGS. 6a and 6b, footing 90 has an overall form of a circular ring with, at its center, a circular hole 91 through which central shaft 20 and more particularly cylindrical barrel 24 of pedestal 21 can be passed.

This footing 90 is provided with a cylindrical side surface 92 and an annular flange 93.

As clearly illustrated in FIG. 3, footing 90 rests at the level of its annular flange 93 on shoulder 21b of pedestal 21, cylindrical side surface 92 thus defining, together with collar 21a and foot 22 of pedestal 21, a housing capable of housing bearings to permit mounting of footing 90 on pedestal 21.

Six hydraulic jacks 81 with vertical axes are mounted on annular flange 93 of footing 90, in a manner uniformly distributed around the vertical axis of central shaft 20.

Thus the six hydraulic jacks 81 are disposed 60° from one another on circular footing 90.

As clearly illustrated in FIG. 12, hydraulic jacks 81 have their rod end fixed to load-transfer ring 50 supporting fuselage structure 10.

Vertical jacks 81 are therefore disposed between footing 90 and load-transfer ring 50 in such a way that a vertical tensile or compressive force is exerted via load-transfer ring 80 on fuselage structure 10 fixed at its lower end 10b to load-transfer ring 50. The applied force is therefore uniformly distributed over lower end 10b of structure 10.

By virtue of this mounting arrangement of horizontal jacks 61 on triangular support plate 70 on the one hand and of vertical jacks 81 on footing 90 on the other hand, it is possible to decorrelate the application of tensile/compressive and torsional forces.

Furthermore, in order to be able to recreate and test a pressure differential existing between the interior and exterior of fuselage structure 10, pressurizing means 100 are disposed between central shaft 20 and fuselage structure 10.

In this embodiment, pressurizing means 100 are composed of a frustoconical structure 100 situated between vertical stanchion 25 and fuselage structure 10; the space between this frustoconical structure 100 and fuselage structure 10 can be pressurized by delivery of compressed air or else by means of a water-filled inflatable balloon.

To this end, there are provided inlets 101 for pressurized fluid, preferably in the lower part of frustoconical structure 100.

Thus frustoconical structure 100 forms a caisson in which the space between central shaft 20 and the fuselage structure can be narrowed.

By virtue of the different force-application means, it is possible to apply to the structure all the mechanical stresses representative of real behavior of the fuselage structure.

In particular, it is possible to apply the following maximum stresses:

|  |  | Static test | Fatigue test |
|---|---|---|---|
| 1: | Pressure + tension | $F_{max}$ = 17,000 kN | $F_{max}$ = 10,000 kN |
| 2: | Pressure + compression | $\Delta P_{max}$ = 3.7 bar | $\Delta P_{max}$ = 1.9 bar |

-continued

|   | | Static test | Fatigue test |
|---|---|---|---|
| 3: | Pressure + torsion | $M_{max}$ = 7,300 kN<br>$\Delta P_{max}$ = 3.7 bar | $M_{max}$ = 4,300 kN<br>$\Delta P_{max}$ = 1.9 bar |
| 4: | Pressure + torsion + compression | $F_{max}$ = 17,000 kN<br>$M_{max}$ = 7,300 kN<br>$\Delta P_{max}$ = 3.7 bar | $F_{max}$ = 17,000 kN<br>$M_{max}$ = 4,300 kN<br>$\Delta P_{max}$ = 1.9 bar |

It will be noted in addition that, by the design of the apparatus such as described hereinabove, the space outside fuselage 10 remains available, as illustrated in FIG. 2, thus permitting inspection of the fuselage structure from the outside.

If fixation of the fuselage structure is established by clamping the structure, it is easily possible to demount the said structure and also to inspect the interior of the structure after the application of stresses.

By virtue of the modular structure of the central shaft, composed of the pedestal and the vertical stanchion, it is possible, especially by changing the vertical stanchion, to adapt to different fuselage structures of variable height.

It will be noted in addition that demounting of the structure in the course of testing can also be avoided by using methods of nondestructive inspection in traditional manner and by using sensors placed beforehand at different points of the fuselage structure.

This test structure makes it possible to study the damage tolerance as well as fatigue and static strength of a structure having double curvature. In particular, it is possible to measure the constraints applied to structure 10, recorded by strain gauges, and to observe all the deflections in the fuselage structure in all spatial directions.

It will be understood that the present invention is not limited to the practical examples such as described hereinabove.

In particular, the number of hydraulic jacks used both to apply a torsional force and to apply a compressive or tensile force is in no way limitative. In addition, force-application means other than hydraulic jacks could be used.

Furthermore, other types of fixation of the fuselage structure at its ends could be used rather than those based on clamping as described hereinabove.

The invention claimed is:

1. A testing apparatus associated with a fuselage ring having a longitudinal curvature and a circumferential curvature, comprising means for applying forces to said fuselage ring, wherein a central shaft extends in the longitudinal direction at the center of the fuselage ring, said central shaft being interlocked with the fuselage ring, and wherein force-application means are mounted on support means interlocked with said central shaft.

2. A testing apparatus according to claim 1, further comprising interlocking means for interlocking said central shaft with an upper end of the fuselage ring the force-application means being capable of applying forces at a lower end of the fuselage ring.

3. A testing apparatus according to one of claim to claim 2, wherein the force-application means are interlocked with a load-transfer ring at a point of application of the forces, said lower end of the fuselage ring being fixed to said load-transfer ring.

4. A testing apparatus according to one of claim 2, wherein said interlocking means are provided with a cover interlocked with an upper end of the central shaft and comprising means for fixing the upper end of the fuselage ring.

5. A testing apparatus according to claim 4, wherein said fixation means are composed of an outer ring and an inner ring capable of maintaining the upper end of the fuselage ring by clamping.

6. A testing apparatus according to claim 5, wherein the upper end of the central shaft comprises a series of flutes extending parallel to the axis of the central shaft and fitting into a series of complementary flutes made on an inner face of said cover.

7. A testing apparatus according to claim 1, wherein said support means include a base plate capable of supporting means for applying forces of a first type and a footing fixed to the central shaft and capable of supporting means for applying forces of a second type.

8. A testing apparatus according to claim 7, wherein the means for applying forces of the first type are capable of applying a torsional force to said fuselage ring, and the means for applying forces of the second type are capable of applying tensile or compressive forces to said fuselage ring.

9. A testing apparatus according to claim 8, wherein said means for applying forces of the first type are capable of applying a tangential force to the curved surface of the fuselage ring.

10. A testing apparatus according to claim 9, wherein said means for applying forces of the first type include at least one jack capable of applying a stress along a horizontal axis and mounted pivotally at its ends around a vertical axis.

11. A testing apparatus according to claim 1, further comprising pressurizing means capable of being disposed between said central shaft and the fuselage ring.

12. A testing apparatus according to claim 1, wherein said central shaft is interlocked with said fuselage ring and with said support means such that said central shaft absorbs stresses applied to the fuselage ring by said force-application means.

13. A testing apparatus according to claim 12, wherein said force-application means include a first plurality of jacks arranged in a plane perpendicular to said central shaft and configured to apply a torsional force to said fuselage ring, and said force-application means further include a second plurality of jacks arranged parallel to said central shaft and configured to apply a tensal or compressive force to said fuselage ring.

14. A testing apparatus for testing a fuselage ring, said fuselage ring having a longitudinal curvature and a circumferential curvature and having a first end and a second end opposite to said first end of said fuselage ring, said testing apparatus comprising:
   a shaft configured to extend inside of fuselage ring in a longitudinal direction, said shaft having a first end and a second end opposite to said end of said shaft;
   a first locking mechanism that locks said first end of said shaft to said first end of said fuselage ring;
   a second locking mechanism that locks a load transfer member to said second end of said fuselage ring;
   a pedestal connected to said second end of said shaft;
   a base plate fixed to said pedestal;
   a first force-application mechanism coupled to said base plate and to said load transfer member so as to apply a tensal or compressive force to said fuselage ring via said load transfer member and via said second end of said fuselage ring; and
   a second force-application mechanism coupled to said base plate and to said load transfer member so as to apply a torsional force to said fuselage ring via said load transfer member and via said second end of said fuselage ring.

15. A testing apparatus according to claim 14, wherein said testing apparatus is free of any connection with said fuselage ring other than said first and second locking mechanisms.

16. A testing apparatus according to claim 14, wherein said load transfer member is a ring.

17. A testing apparatus according to claim 14, wherein said first and second locking mechanisms and said shaft are configured such that, when said testing apparatus is fixed to said fuselage ring, said shaft being inside said fuselage ring, said first and second locking mechanisms extend beyond said fuselage ring such that an entire outer surface of said fuselage ring between said first and second locking mechanisms is exposed and viewable for inspection during testing of said fuselage ring.

18. A testing apparatus according to claim 14, wherein said first lock mechanism comprises a cover that covers said first end of said shaft and that clamps said first end of said fuselage ring.

19. A testing apparatus according to claim 14, wherein said first lock mechanism comprises an outer ring and an inner ring, wherein said outer ring has a first frustoconical portion that conforms to an outer surface of said first end of said fuselage ring, and said inner ring has a second frustoconical portion that conforms to an inner surface of said first end of said fuselage ring such that said first and second frustoconical portions are configured to pinch said first end of said fuselage ring between said outer and inner rings.

20. A testing apparatus according to claim 14, wherein said shaft is coupled to said fuselage ring and to said base plate such that said shaft absorbs stresses applied to the fuselage ring via said load transfer member and via said second end of said fuselage ring.

21. A testing apparatus according to claim 14, wherein said first force-application mechanism includes a first plurality of jacks arranged parallel to said shaft and configured to apply said tensal or compressive force to said fuselage ring, and said second force-application mechanism further includes a second plurality of jacks arranged in a plane perpendicular to said shaft and configured to apply said torsional force to said fuselage ring, wherein said first and second pluralities of jacks are entirely contained between said base plate and said load transfer member.

* * * * *